United States Patent
Grant

(10) Patent No.: US 11,252,950 B2
(45) Date of Patent: Feb. 22, 2022

(54) FISHING REEL SPOOL LINE CLASP

(71) Applicant: Mitchell W. Grant, Mechanicsville, VA (US)

(72) Inventor: Mitchell W. Grant, Mechanicsville, VA (US)

( * ) Notice: Subject to any disclaimer, the term of this patent is extended or adjusted under 35 U.S.C. 154(b) by 0 days.

(21) Appl. No.: 16/833,764

(22) Filed: Mar. 30, 2020

(65) Prior Publication Data

US 2020/0344989 A1 Nov. 5, 2020

Related U.S. Application Data

(60) Provisional application No. 62/842,007, filed on May 2, 2019.

(51) Int. Cl.
*A01K 89/01* (2006.01)
*A01K 89/015* (2006.01)

(52) U.S. Cl.
CPC .............................. *A01K 89/01931* (2015.05)

(58) Field of Classification Search
CPC .......... A01K 89/01931; A01K 89/0111; B65H 75/28; B65H 75/285
USPC ............................................... 242/586, 532.1
See application file for complete search history.

(56) References Cited

U.S. PATENT DOCUMENTS

| | | | | |
|---|---|---|---|---|
| 5,167,378 A | * | 12/1992 | Johanson | G11B 23/08728 242/586.2 |
| 2002/0195511 A1 | * | 12/2002 | Heesch | A01K 89/0111 242/322 |
| 2003/0136866 A1 | * | 7/2003 | Kitajima | A01K 89/0111 242/307 |
| 2015/0028143 A1 | * | 1/2015 | Hiraoka | A01K 89/0111 242/322 |

FOREIGN PATENT DOCUMENTS

| | | | | |
|---|---|---|---|---|
| CA | 2208875 A1 | * | 12/1998 | ......... A01K 89/0111 |
| EP | 2210486 A1 | * | 7/2010 | ......... A01K 89/0111 |
| GB | 2454519 A | * | 5/2009 | ......... A01K 89/0111 |
| WO | WO-8001064 | * | 5/1980 | ............. B65H 75/28 |

\* cited by examiner

*Primary Examiner* — Emmanuel M Marcelo
(74) *Attorney, Agent, or Firm* — John H. Thomas, P.C.

(57) ABSTRACT

A clasp is fixed onto a reel and may be original equipment in the reel, or alternatively, the spool may be a replacement or supplemental spool for use in an existing reel. The spool component of a reel includes a central core with flanges on each side to retain a line wound thereon. The spool is intended to be rotated/spun in the reel or alternatively fixed where the line feeder rotates around the spool. The clasp may be positioned on the surface of the core or on the inside surface of one of the side flanges. This way, a fishing line is anchored on the inside of a spool as the line is wound around and builds up outwardly in the spool.

12 Claims, 8 Drawing Sheets

FISHING REEL SPOOL LINE CLASP

This application claims the benefit of U.S. Provisional Application No. 62/842,007, filed May 2, 2019, which is incorporated by reference herein in its entirety.

The invention is directed to fishing reels and specifically to the spool component of a fishing reel. The spool includes a line clasp that will anchor a line to the spool to facilitate winding of the line around the spool.

BACKGROUND

Virtually all fishing reels have a spool component around which fishing line is wound and retained. A spool is used with spinning reels, bait cast reels, fly rods and most any other fishing assemblies beyond the old-fashioned stick with a line tied onto one end. In order to start a fishing line on a spool, the end of the line is fed through any necessary reel guides, if any, and then tied around the spool core. If the line is not tied tightly enough, then the line may slide around the spool core during winding and possibly even during use. This can cause difficulty with initial winding of a fishing line onto the spool. It can also be a problem when a fish on the hook is fighting and possibly pulling the line around and off of the spool. Regardless, it is at least a nuisance to tie a line tightly around a spool core to anchor the line to that spool.

SUMMARY

Accordingly, it is an object of the present invention to fix a clasp onto a spool to attach a line to the spool for winding and use of the fishing line. The clasp may be rigidly fixed to the core or otherwise fixed to the core by way of some type of spring action. The clasp acts as an anchor or cleat for the start of the fishing line to be wound onto the spool.

In one example, a fishing reel spool line clasp comprises a spool around which fishing line is adapted to be wound and unwound, the spool comprising a core and side flanges. A clasp is attached to a surface of the spool, wherein the clasp has a front end and a back end; wherein the front end of the clasp is elevated from the surface of the spool to create a gap between the spool and the clasp; and further wherein the front end of the clasp is on an end of the clasp in the direction of winding of the fishing line around the spool; whereby the fishing line is anchored on the spool between the clasp and the spool. The clasp may be attached to the spool on a surface of the core of the spool, or alternatively, to the spool on a surface of the side flange of the spool. The back end of the clasp may be attached to the surface of the spool, or alternatively may be hingedly attached to the surface of the spool, or still further alternatively may be hingedly attached to the surface of the spool. The clasp may have a top surface and is attached to the spool by springs, wherein the clasp has up and down positions and is releasably fixable in each of those positions, and in the down position, the top surface of the clasp is substantially flush with the surface of the spool. The clasp may have a top surface and the top of the clasp has a triangular shape, or alternatively a semicircular shape, or still further alternatively a round shape. The height of the clasp above the spool surface may be about 0.01 to 0.1 inches, or alternatively, about 0.02 to 0.05 inches. The clasp portion may comprise a flat flap portion, or alternatively, a curved flap portion.

DETAILED DESCRIPTION

Fishing reels that benefit from the present clasp include all reels with a spool component including, but not limited to, spinning reels, bait cast reels and fly reels. The clasp may be original equipment in a reel, or alternatively, the spool may be a replacement or supplemental spool for use in an existing reel.

The spool component of a reel includes a central core with flanges on each side to retain a line wound thereon. The spool is intended to be rotated/spun in the reel or alternatively fixed where the line feeder rotates around the spool. The clasp described herein may be positioned on the surface of the core or on the inside surface of one of the side flanges. This way, a fishing line is anchored on the inside of a spool as the line is wound around and builds up outwardly in the spool. For instance, the many of the drawings herein illustrate examples of clasps that are positioned generally on the surface of the core portion of a spool. The clasp may alternatively be positioned anywhere on the surface of the core or on the inside surface of one or both of the spool flanges.

Figure 1:
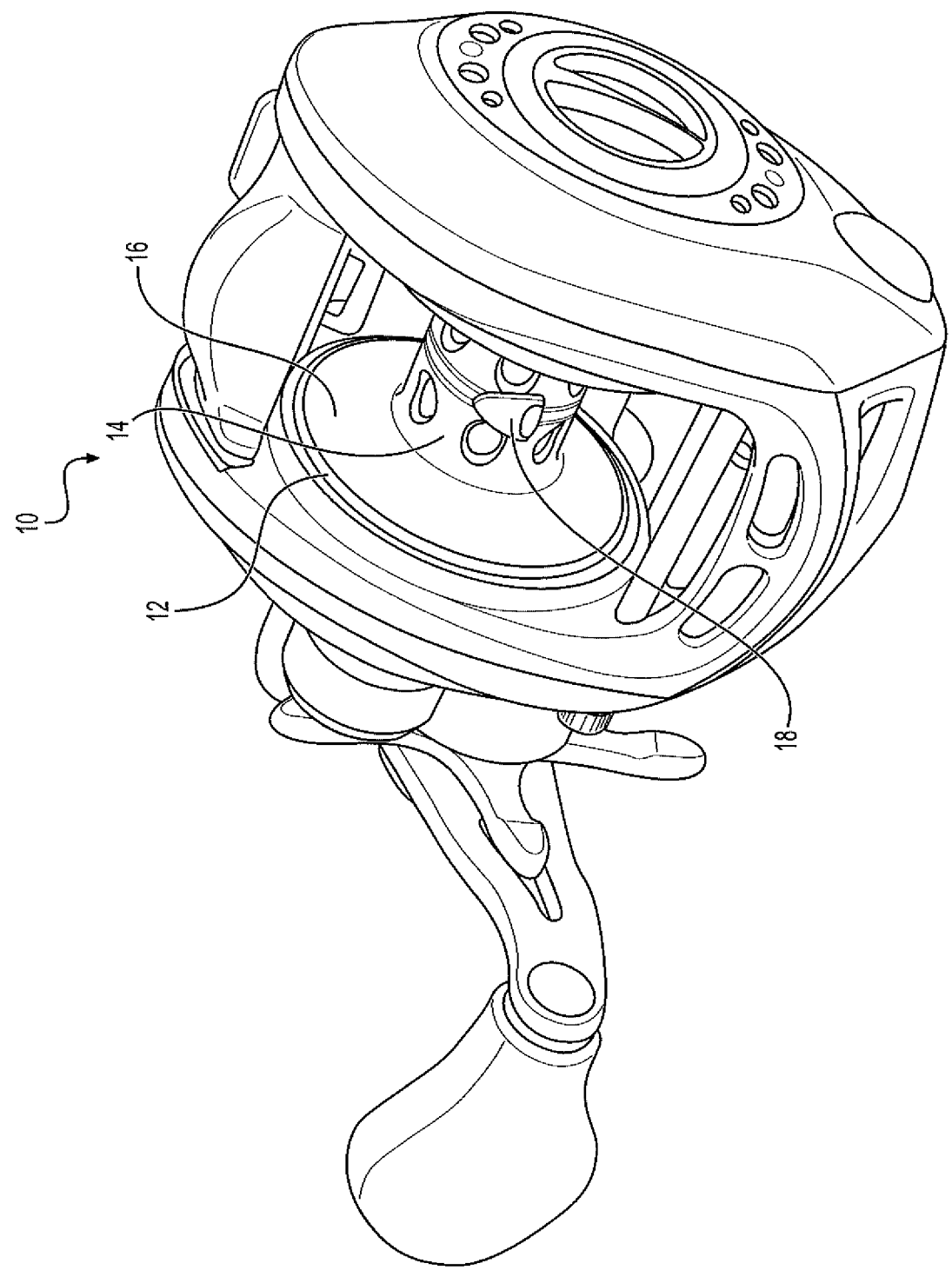
FIG. 1 is a perspective view of a bait cast reel having a spool with a clasp as described herein.
Figure 2:
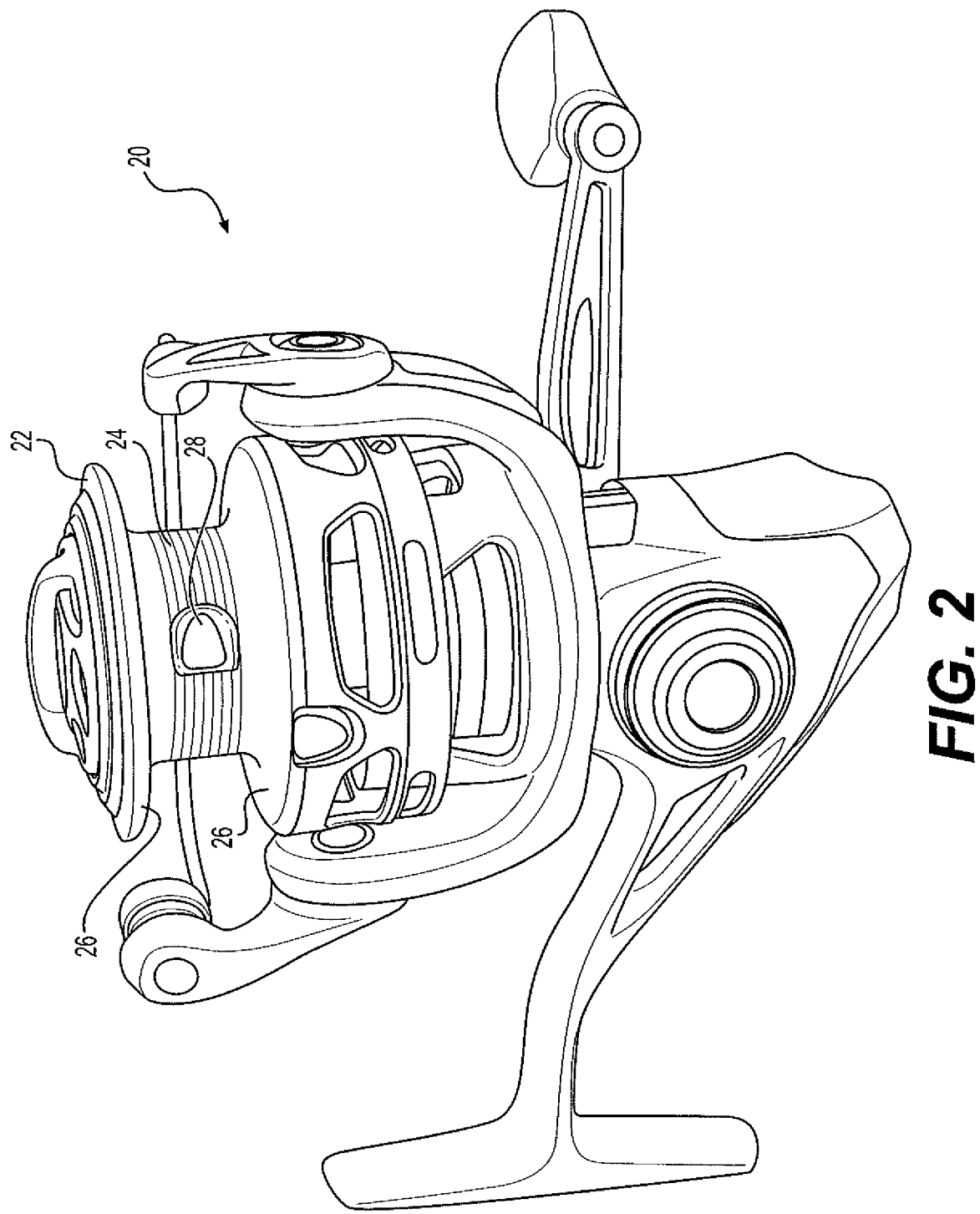
FIG. 2 is a perspective view of a spinning reel having a spool with a clasp as described herein.

FIGS. 1 and 2 are simple perspective views of a bait cast reel 10 and a spinning reel 20. In each example there is a spool 12 and 22 respectively. The spool 12 is made up of a core 14 and flanges 16. Likewise, spool 22 is made up of a core 24 and a pair of flanges 26. Examples of a clasp 18 and 28 are shown in FIGS. 1 and 2 respectively. The clasps 18 and 28 in these examples are positioned onto approximately the middle of the surface of the respective cores 14 and 24.

Figure 3:
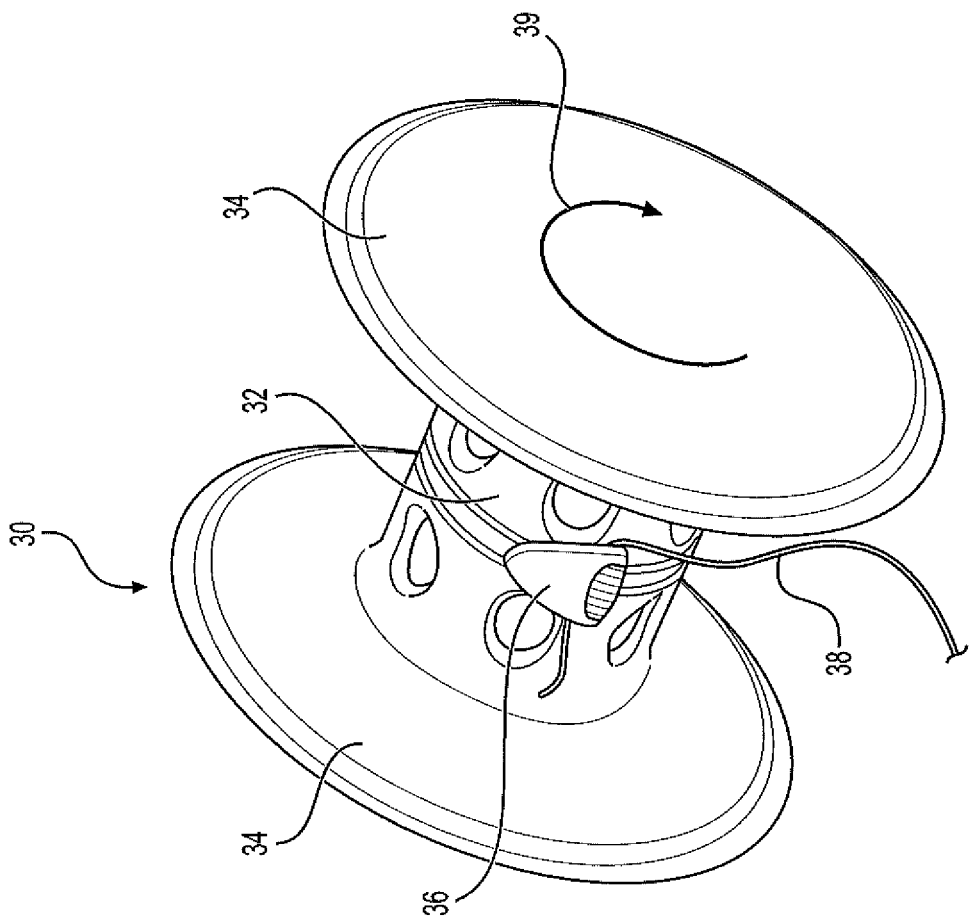
FIG. 3 is a perspective view of a spool with a clasp fixed thereon with a piece of fishing line anchored therein.

FIG. 3 illustrates a simple spool 30 that might be used in multiple different fishing reels. The spool 30 has a core 32 and flanges 34. A clasp 36 is fixed to the surface of the core 32. A fishing line 38 is fed under and held by a friction fit under the clasp 36. In this example of FIG. 3, the spool 30, and particularly the clasp 36 is intended to rotate in the clockwise direction as shown by the arrow 39.

The clasp referred to herein is a low-profile cleat or anchor to fix the end of a fishing line onto or around. The clasp is relatively low profile, because other than holding the end of the fishing line it is not intended to interfere with the action of the fishing line winding or unwinding on the spool. In some examples, the clasp flap extends outwardly from a core or flange surface so that the top of the clasp flap is up to about 0.01 to 0.1 inches above the surface of the spool core or flange. Alternatively, the clasp flap extends outwardly from the spool surface the top of the clasp is above the spool surface about 0.02 to 0.05 inches. The clasp flap is the portion of the clasp that has a back end connected to the spool core surface and a front end that is above the surface of the spool core.

The thickness of the flap portion of the clasp is less than the outward height of the clasp from the core surface so that a gap is formed between the bottom of the flap portion of the clasp and the surface of the spool core, at least at the front end of the flap. This gap is where a fishing line may be pinched in a friction fit under the clasp flap. Alternatively, a user might fashion a small loop on the end of the line and the loop is caught in the gap beneath the clasp flap.

The clasp shape, especially the shape of the flap portion of the clasp, may be generally triangular as shown in the drawings, FIGS. 1-3. The front end of the flap portion is generally pointed. This front end portion is pointed in the direction of rotation of the spool. The clasp may alternatively have a more semi-circular or oval shape of the leading, front edge. This front edge shape may alternatively be any other asymmetric or geographic shape. The clasp may have a button shape where the top flap portion of the clasp is round or oval or square or a different geographic shape. The top surface and side edges of the flap portion are typically smooth to facilitate the movement of fishing line across its surface as the line is wound and unwound from the spool. The flap portion may be formed of steel or aluminum or other metal, or it may be formed of plastic or some hybrid of metal and plastic.

Figure 4:
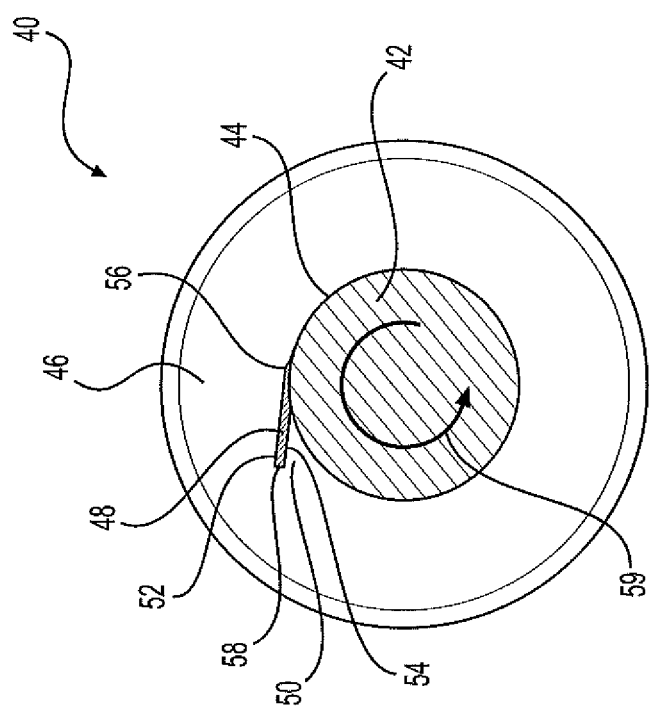
FIG. 4 is a side, cross-sectional view of a spool with a clasp rigidly fixed thereon.

In one example, for instance in FIG. 4, the clasp may be fixed onto the surface of a core portion of a spool. In this example, the flap portion of the clasp is flat and has a back end that is fixed onto the surface of the core. The front end of the flap sticks out and above the surface of the core to form a gap under the flap. In FIG. 4, the back end of the flap is secured directly to the core surface, and the flap is generally flat and tilted upwardly therefrom. Accordingly, the gap that forms under the flap and above the core surface shrinks from the leading edge down to the back end. This shrinking gap allows a fishing line to be pinched between the clasp and core surface regardless of the thickness of the line. Alternatively, the back end of the flap may be attached to a vertical connection with the core surface. This means that the gap under the flap portion of the clasp is generally even. In this example, a fishing line is not pinched under the flap. Rather, the user could fashion a loop tied in the line and then place the loop under the flap to secure the line during winding. In another example, the flap may be curved with the shape of its curvature larger that the spool core curvature so that a gap forms underneath it between the bottom surface of the flap and the spool surface.

In FIG. 4, there is shown a spool 40 with a core 42, a core surface 44 and one flange 46 is seen in this cross-sectional view. The clasp 48 is a generally flat and straight flap that has top and bottom surfaces 52 and 54. The clasp 48 further has front end 58 and back end 56, with the back end rigidly fixed to the surface 44 of the core 42. Because of the flat nature of the clasp 48 and the curved nature of the core surface 44, there is a gap 50 between the bottom surface 54 of the clasp and the surface 44 of the core 42 under the front end 58. This gap 50 in FIG. 4 is not shown to scale, rather it is exaggerated to be able to clearly see and visualize the gap. Finally, in this FIG. 4, the spool 40 is intended to rotate in the counter-clockwise direction as indicated by arrow 59 during winding (and in the opposite direction during unwinding).

Figure 5A:
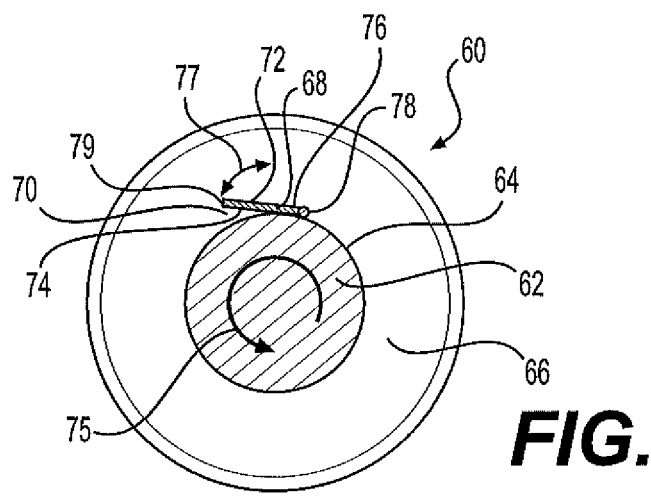
FIG. 5A is a side, cross-sectional view of a spool with a clasp spring-mounted onto the core of the spool.

In another example as shown in FIG. 5A, the clasp may be a flap that is attached by a spring on its back end to a spool core surface. The spring attached to the back end portion of the clasp is biased to the closed position that pulls the clasp down onto the core surface. The front edge of the flap portion of the clasp is configured so that a user may use their fingernail or finger to rotate the front end upwardly against the spring action. The fishing line is then fed under the clasp. The user then simply allows the clasp to snap back down onto the line to retain it there during winding and use.

Referring to FIG. 5A, the spool 60 has a core 62 and top surface 64 of the core. Because of this side, cross-sectional view, there is shown only a single flange 66. In this example, the clasp 68 is comprised of a generally flat flap. The clasp 68 has a top side 72 and bottom side 74. There is the front end 79 and the back end 76. The back end 76 of the clasp 68 is connected to a spring 78 on the surface 64 of the core 62. Therefore, the front end 79 may rotate upwardly as shown by arrow 77. A gap 70 is formed between the bottom 74 of the clasp 68 and the surface 64 of the core 62. It is in this gap 70 that a fishing line may be wedged and secured. In this FIG. 5A, the spool 60 is intended to rotate in the counter-clockwise direction as noted by arrow 75 during winding.

Figure 5B:
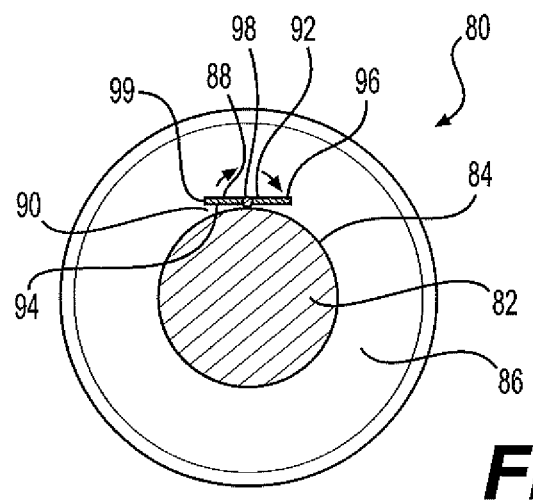
FIG. 5B is a side, cross-sectional view of an alternative embodiment of a spool with a clasp spring-mounted onto the core of the spool.

In still another example in FIG. 5B, the clasp flap may be attached by a spring in the middle portion of the flap to the surface of the spool core. The flap portion of the clasp is generally flat. Therefore, with the middle portion connected to the round cross-section core, then each end of the flap, both front and back ends, extends upwardly from the core surface. In this configuration, a user may simply press down one end of the flap to flip upwardly the other, opposite end against the bias of the spring. The line is then placed under the flap of the clasp. When the user lets go of the one end, then the opposite end rotates down and onto the fishing line to retain the line there.

In FIG. 5B, there is shown a spool 80 that has a core 82 and core surface 84. Only one flange 86 is shown in this cross-sectional view. A clasp 88 is generally flat and straight. The clasp 88 has a top side 92 and bottom side 94 and a front end 99 and a back end 96. A spring 98 rotatably secures the clasp 88 to the surface 84 of the core 82. By pushing downwardly on the back end 96 of the clasp 88, the front end 99 is raised. A line may be fed into the gap 90 under the front end 99 and then releasably secured there.

Figure 6:
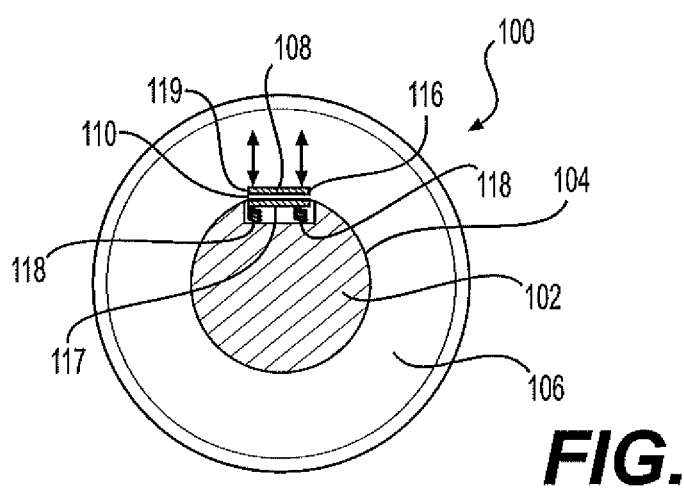
FIG. 6 is a side, cross-sectional view of a second alternative embodiment of a spool with a clasp spring-mounted onto the core of the spool.

An additional example is shown in FIG. 6. In this example of a clasp, the clasp is spring-mounted wherein the clasp moves up and down from the surface of the spool core. This is a snap mechanism where the user may push on the top of the clasp to release and free the clasp to move upwardly a short distance. This opens up a gap between the bottom of the flap portion of the clasp and the surface of the spool core. A fishing line may then be fed into the gap under the clasp. The user then simply presses the clasp back down to releasably lock the clasp down and secure the line in a friction fit between the flap and the spool core surface.

FIG. 6 shows a spool 100 that includes a core 102 and core surface 104 and a flange 106. The clasp 108 moves in an up and down motion. There is a front end 119 and a back end 116. The back end 116 is connected to a bottom portion 117 of the clasp 108. The bottom portion 117 is in turn connected to springs 118 that bias the clasp 108 upwardly, but which may be releasably locked down in use. When released in the upward position shown in the FIG. 6, the clasp 108 has an opening 110. In a releasable locked down position (not shown), a line fed into the gap 110 will be releasably locked under the clasp 108.

This version of a clasp as shown in FIG. 6 where the clasp moves up and down can have different shapes. It can be shaped like a button that snaps up and down with a center post and a round top. Other shapes and location of a post that moves up and down are also possible.

The spring in each of these examples may be a spiral wound spring or a leaf spring. The spring may also be engineered into a live hinge on the back side of the clasp flap.

The clasp itself, and especially the flap portion, has a polished or smooth top surface to enable smooth winding and unwinding of line over the clasp. The top surface may be coated, for instance with Teflon or a similar coating to enhance low friction. On the other hand, the bottom of the flap portion may have an intentionally roughened surface to better grip a line that is clamped under it.

Figure 7A:
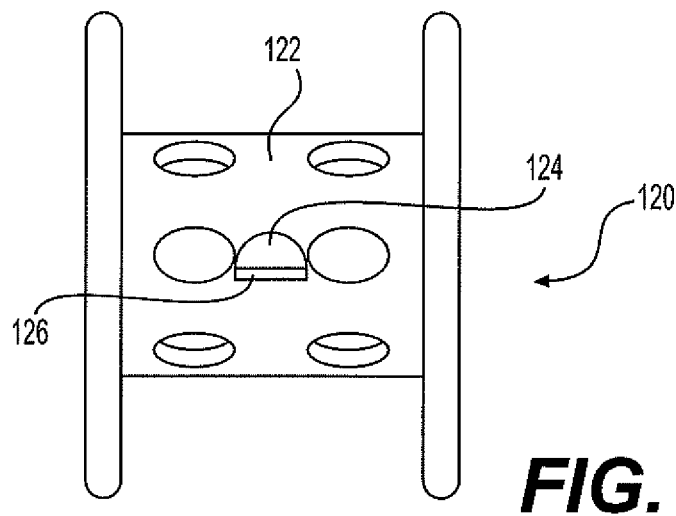
FIGS. 7A-C are front views of alternative embodiments of a spool with semi-circular, round and square line clasps respectively.
Figure 7B:
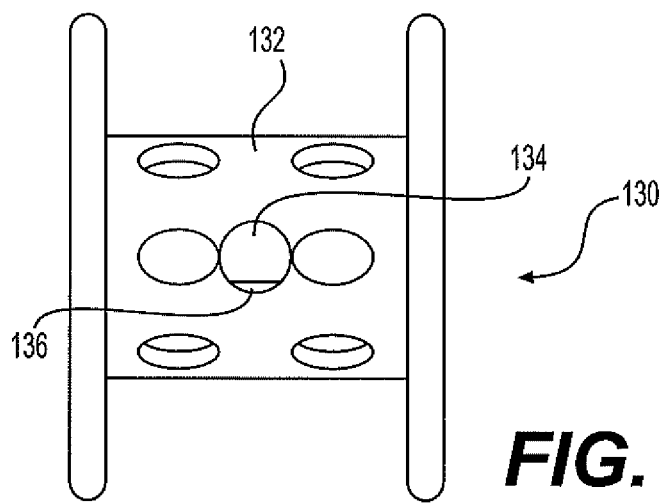
Figure 7C:
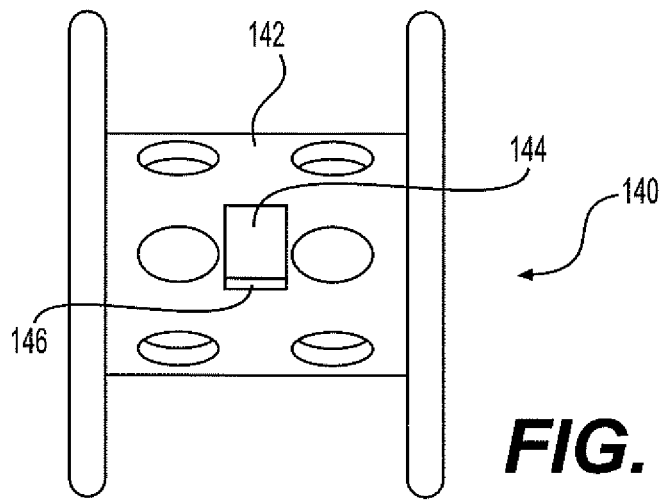

FIGS. 7A-C illustrate different shaped clasps that may be chosen. In FIG. 7A, a spool 120 has a core 122 with a semi-circular clasp 124 attached at the center of the width of the core. The clasp 124 is attached on its back edge 126 to the core 122. FIG. 7B shows a spool 130 with a core 132 and a circular clasp 134 attached at its back edge 136 to the core. FIG. 7C shows a spool 140 with a core 142 and a rectangular clasp 144 connected by its back edge 146 to the core. In each embodiment shown in FIGS. 7A-C, the respective clasps may be attached to the respective cores by a rigid attachment or by a spring or by a push-button click as described also herein and shown in the other figures. These FIG. 7A-C merely show that the clasp may take different shapes including but not limited to these shapes and, as an example only, the triangular shape of the clasp 36 in FIG. 3.

Figure 8:
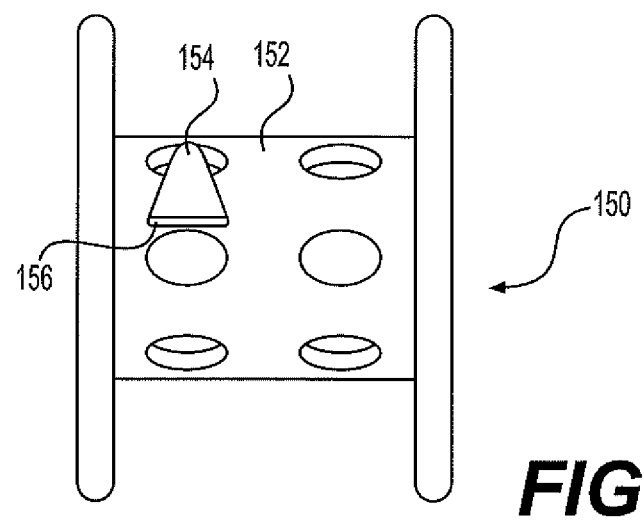
FIG. 8 is a front view of a spool with a line clasp mounted offset on the core of the spool.

FIG. 8 illustrates a spool 150 with a core 152 and a clasp 154 attached by its back edge 156 to the core on a side of the core. The example illustrated in FIG. 8 is merely an example that demonstrates that the clasp 154 may be fixed anywhere across the width of the core 152. The earlier examples merely attached a clasp to the center of the width of the respective cores.

Figure 9:
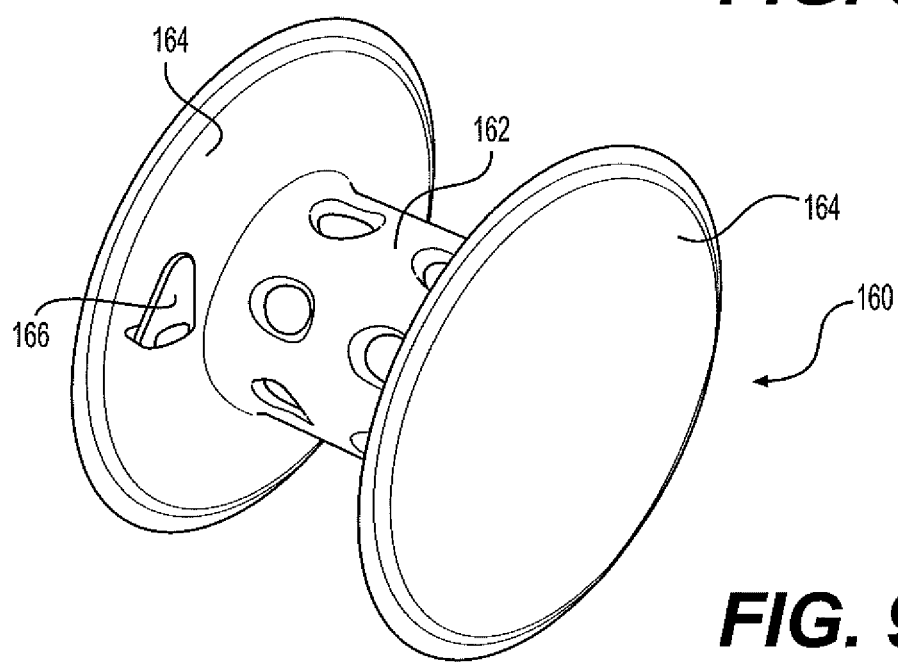
FIG. 9 is a perspective view of a spool with a line clasp mounted on the inside of a flange of the spool.

FIG. 9 illustrates a spool 160 with a core 162 and side flanges 164 and a clasp 166 fixed to an inside of a flange. Accordingly, the clasp 166 is a demonstration that the clasp may alternatively be fixed to a reel flange such as flange 164. Of course, the clasp such as clasp 166 may alternatively be any shape such as illustrated earlier herein.

Figure 10:
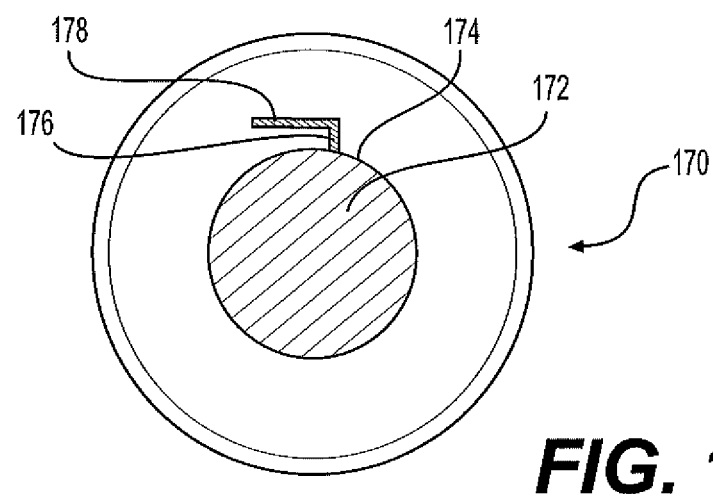
FIG. 10 is a side, cross-sectional view of a spool with a line clasp having a vertical post attached to a flat top of the clasp.

FIG. 10 is an example of a spool 170 with a core 172 and core surface 174. In this example, the clasp 178 is a flat piece connected to a post 176 extending outwardly from the core 172 surface 174. This example of a clasp 178 is an alternative example to the clasp 48 that is fixed directly to the surface 44 of the core 42 in FIG. 4. The post 176 is essentially perpendicular to the core surface 174.

Figure 11A:
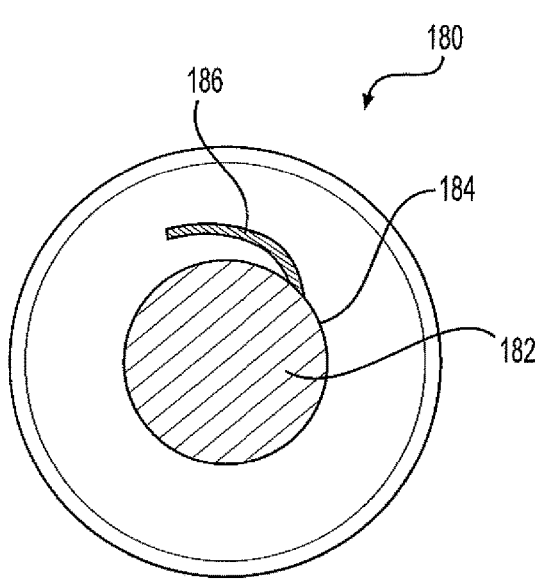
FIGS. 11A and B are side, cross-sectional views of alternative embodiments of a clasp with a curved top portion.
Figure 11B:
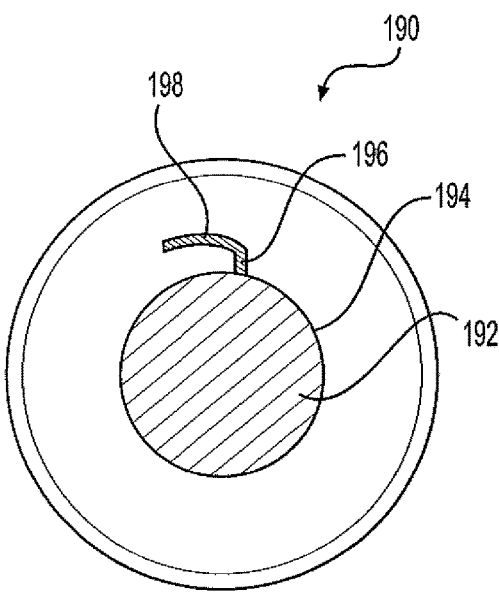

FIGS. 11A and B illustrate alternative clasp connections to a core. In FIG. 11A, a spool 180 has a core 182 and core surface 184. The clasp 186 is a curved piece with a general curve along its entire length, but at a greater radius than the curvature of the core surface 184, thereby diverging from and forming a space between the core surface and the underside of the clasp. FIG. 11B illustrates a reel spool 190 with a core 192 and core surface 194. In this alternative example, the clasp 198 is curved, but it is attached to a short vertical post 196 that extends straight out from the core surface 194.

Figure 12A:
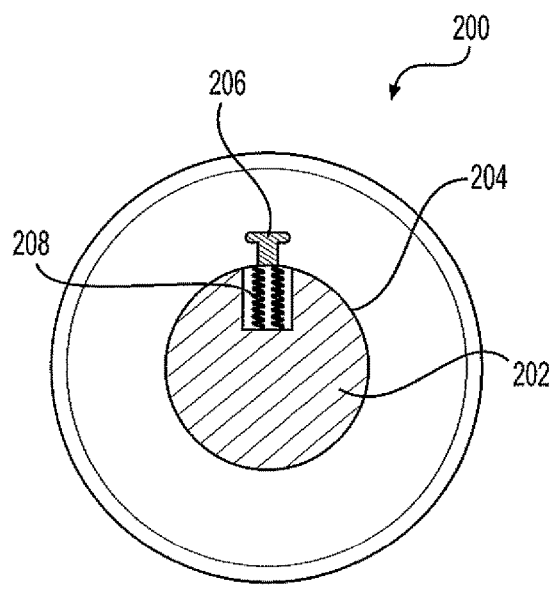
FIGS. 12A and B are side cross-sectional views of a push-button line clasp in its extended and nested positions respectively.
Figure 12B:
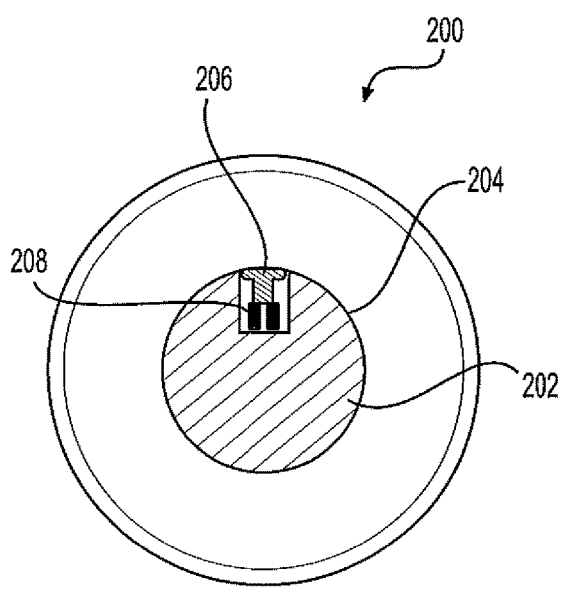

FIGS. 12A and B illustrate an alternative example of a push-button click post like the one shown in FIG. 6. In FIGS. 12A and B, there is shown a spool 200 with a core 202 and core surface 204. A post 206 is mounted on springs 208 that allows the post to move up and outwardly (FIG. 12A) and snap back into the core 202 (FIG. 12B). In the retracted position, the post 206 is releasably pressed into the core 202 so that the top of the post is generally flush with the core surface 204.

Other embodiments of the present invention will be apparent to those skilled in the art from consideration of the specification. It is intended that the specification and figures be considered as exemplary only, with a true scope and spirit of the invention being indicated by the claims.

That which is claimed is:
1. A fishing reel spool line clasp comprising
a spool around which fishing line is adapted to be wound and unwound, the spool comprising a core and side flanges;
a clasp attached to the spool on a surface of the core of the spool, wherein the clasp has a front end and a back end;
wherein the front end of the clasp is elevated from the surface of the spool to create a gap between the spool and the clasp;
further wherein the front end of the clasp is on an end of the clasp in the direction of winding of the fishing line around the spool;
whereby the fishing line is anchored on the spool between the clasp and the spool.
2. A fishing reel spool line clasp as described in claim 1, wherein the clasp is hingedly attached to the surface of the spool.
3. A fishing reel spool line clasp as described in claim 1, wherein the clasp has a top surface and the top of the clasp has a triangular shape.
4. A fishing reel spool line clasp as described in claim 1, wherein the clasp has a top surface and the top of the clasp has a semicircular shape.
5. A fishing reel spool line clasp as described in claim 1, wherein the clasp has a top surface and the top of the clasp has a round shape.
6. A fishing reel spool line clasp as described in claim 1, wherein the clasp flap extends outwardly from the core surface so that the top of the clasp flap is up to about 0.01 to 0.1 inches above the surface of the spool core.
7. A fishing reel spool line clasp as described in claim 1, wherein the clasp flap extends outwardly from the core surface so that the top of the clasp flap is up to about 0.02 to 0.05 inches above the surface of the spool core.
8. A fishing reel spool line clasp as described in claim 1, wherein the clasp portion comprises a flat flap portion.
9. A fishing reel spool line clasp as described in claim 1, wherein the clasp portion comprises a curved flap portion.
10. A fishing reel spool line clasp comprising,
a spool around which fishing line is adapted to be wound and unwound, the spool comprising a core and side flanges;
a clasp attached to a surface of the spool, wherein the clasp has a front end and a back end;
wherein the front end of the clasp is elevated from the surface of the spool to create a gap between the spool and the clasp;

further wherein the front end of the clasp is on an end of the clasp in the direction of winding of the fishing line around the spool;

whereby the fishing line is anchored on the spool between the clasp and the spool, and wherein the back end of the clasp is attached to the surface of the spool.

11. A fishing reel spool line clasp comprising a spool around which fishing line is adapted to be wound and unwound, the spool comprising a core and side flanges;

a clasp attached to a surface of the spool, wherein the clasp has a front end and a back end;

wherein the front end of the clasp is elevated from the surface of the spool to create a gap between the spool and the clasp;

further wherein the front end of the clasp is on an end of the clasp in the direction of winding of the fishing line around the spool;

whereby the fishing line is anchored on the spool between the clasp and the spool, and wherein the back end of the clasp is hingedly attached to the surface of the spool.

12. A fishing reel spool line clasp comprising a spool around which fishing line is adapted to be wound and unwound, the spool comprising a core and side flanges;

a clasp attached to a surface of the spool, wherein the clasp has a front end and a back end;

wherein the front end of the clasp is elevated from the surface of the spool to create a gap between the spool and the clasp;

further wherein the front end of the clasp is on an end of the clasp in the direction of winding of the fishing line around the spool;

whereby the fishing line is anchored on the spool between the clasp and the spool, and wherein the clasp has a top surface and is attached to the spool by springs, wherein the clasp has up and down positions and is releasably fixable in each of those positions, and in the down position, the top surface of the clasp is substantially flush with the surface of the spool.

* * * * *